United States Patent

Münzel et al.

[11] Patent Number: 5,301,978
[45] Date of Patent: Apr. 12, 1994

[54] MOTOR VEHICLE OCCUPANT PROTECTIVE DEVICE

[75] Inventors: Wolf-Dietrich Münzel, Altdorf; Gudrun Delonge-Immik, Kornwestheim; Wolfgang Henseler, Tübingen; Heinz Knoll, Stuttgart; Karl Peitsmeier, Remseck-Aldingen; Helmut Patzelt, Kernen, all of Fed. Rep. of Germany

[73] Assignee: Mercedes-Benz AG, Fed. Rep. of Germany

[21] Appl. No.: 839,550

[22] Filed: Feb. 24, 1992

[30] Foreign Application Priority Data

Feb. 23, 1991 [DE] Fed. Rep. of Germany ....... 4105788
Dec. 18, 1991 [DE] Fed. Rep. of Germany ....... 4141835

[51] Int. Cl.⁵ .............................................. B60R 21/26
[52] U.S. Cl. ..................................................... 280/737
[58] Field of Search ................ 280/737, 731, 732, 736, 280/743; 137/68.2

[56] References Cited

U.S. PATENT DOCUMENTS

| | | |
|---|---|---|
| 2,834,609 | 5/1958 | Bertrand . |
| 3,602,526 | 8/1971 | Brawn . |
| 3,642,304 | 2/1972 | Johnson et al. ..................... 280/737 |
| 3,869,143 | 3/1975 | Merrell ............................... 280/737 |
| 3,960,390 | 6/1976 | Goetz . |
| 3,966,226 | 6/1976 | Roth .................................. 280/737 |
| 3,968,980 | 7/1976 | Hay ................................. 280/737 X |
| 4,021,058 | 5/1977 | Suzuki et al. . |
| 4,288,005 | 9/1981 | Soo-Hoo ........................ 280/737 X |

FOREIGN PATENT DOCUMENTS

| | | |
|---|---|---|
| 1781383 | 12/1970 | Fed. Rep. of Germany . |
| 2118745 | 11/1972 | Fed. Rep. of Germany . |
| 2305908 | 8/1973 | Fed. Rep. of Germany . |
| 7430839 | 4/1975 | France . |

Primary Examiner—David M. Mitchell
Assistant Examiner—Gary C. Hoge
Attorney, Agent, or Firm—Evenson, McKeown, Edwards & Lenahan

[57] ABSTRACT

A protective device for motor vehicle airbag systems to protect the vehicle occupants utilizes a vessel whose wall piece, which can break out, is configured as part of the wall of a hollow valve block provided with the outflow orifice. The wall piece is equipped with an extension projecting into the interior of a valve block. The piston rod is guided displaceably, transversely relative to the extension in the valve block, and moved by a pyrotechnic propellant charge. The rod serves to break out the wall part and is provided with a collar which, in the event of ignition, strikes against the extension and thus leads not to a violent breaking-out, but to a pivoting of the wall piece before the final breaking-out.

24 Claims, 4 Drawing Sheets

MOTOR VEHICLE OCCUPANT PROTECTIVE DEVICE

BACKGROUND AND SUMMARY OF THE INVENTION

The present invention relates to a protective device for the occupants of a motor vehicle, especially of a passenger car, and, more particularly, to a protective device having a pressure vessel which serves for the storage of a pressurized gas and which is connected, via an outflow orifice provided in the pressure-vessel wall, to the interior of a bag inflatable by the gas. The outflow orifice is closeable via at least one valve consisting of a pressure-vessel wall piece surrounded by a predetermined breaking point and of a piston rod which is connected operatively to this wall piece. The piston rod projects on one side from a closed tripping cylinder filled with a pyrotechnic medium and is axially displaceable out of a first end position into a second by a piston arranged in the tripping cylinder when the pyrotechnic medium is ignited.

A protective device for an airbag system is shown in German Offenlegungsschrift No. 2,118,745. This device comprises a can-shaped, essentially cylindrical vessel having in its interior, and coaxially relative to its longitudinal mid-axis, a cylinder which is filled with pyrotechnic material and in which a piston connected firmly to a piston rod projecting from the cylinder on one side is so arranged that in the first end position of the piston rod, that is to say when the airbag system is not tripped, it can still cover a specific distance until its end face butts against the cylinder. The end of the piston rod facing away from the piston bears perpendicularly against a plate-like wall part of the cylindrical vessel which is surrounded by a predetermined breaking point. Consequently, when ignition occurs in the tripping cylinder, the piston rod is pressed violently by the piston, coming under pressure, against the wall part which breaks out at its predetermined breaking points and which causes the gas located in the pressure vessel to flow into the inflatable bag. To prevent the compressed gas from entering the bag too violently, the cylindrical vessel is surrounded by a second vessel equipped with a cover which is guided displaceably in the direction of the axis of the piston rod and covers the vessel and which is provided over its entire circumference with outlet holes for the escaping compressed gas. The compressed gas flowing out of the pressure vessel as a result of the violent breaking-open of the wall part is advantageously throttled and distributed. In an emergency, however, the cover acting as a distributor and guided telescopically on the inner vessel and on the outer vessel can jam.

Other types of protective devices as shown, for example, in German Offenlegungsschrift No. 2,305,908, possess similar plate-like valves which are blasted off on the end face of the pressure vessel when a propellant charge is ignited. Pressure vessels are also known, e.g. German Offenlegungsschrift No. 1,781,383, which can be arranged transversely relative t the direction of travel of the vehicle in an elongate recess in the vehicle dashboard. These pressure vessels are surrounded concentrically by an outer vessel provided with a horizontal slit-like outlet orifice and are broken open over their entire length along a horizontal predetermined breaking line as a result of the explosion of an explosive charge. In all these instances, an undesirable uncontrolled inflation of the impact bag facing the driver or the front passenger occurs.

An object on which the present invention is based is, therefore, to provide a protective device such that the undesirable violent escape of the compressed gas into the airbag is prevented.

This object has been achieved, in a protective device with a wall piece which is part of the wall of a hollow valve block provided with the outflow orifice. The wall piece is equipped with an extension projecting into the interior of the valve block, the piston rod is displaceable in the valve block transversely relative to the extension, and the extension is located in the path of movement of the piston rod.

As a result of this configuration, the wall piece is not torn out perpendicularly to the plane in which its predetermined breaking points lie, but pivoted relative to this plane. The wall piece pivots in a flap-like manner about initially remaining connecting points, before it can be torn out completely by the force of the outflowing compressed gas. Consequently, during axial displacement of the piston rod, sickle-like orifices first occur on two opposite sides of the loosening wall piece, and these increase in size until the entire valve orifice is opened. It thereby becomes possible to control the quantity of outflowing compressed gas and to keep it relatively small in the initial phase, before the entire available quantity of compressed gas flows out violently. The present invention consequently allows a perfect, fault-free deployment of the initially folded-together impact bag without fearing an obstruction caused by a jamming of mechanically guided parts, and also makes it possible to obtain a lefthand-twist characteristic line for the outflow.

Another advantage of protective devices constructed according to the present invention resides the outflow orifice covered by a cap-like cover, which itself is provided with outflow orifices, if the piston rod is equipped, at its end facing away from the actuating piston, with the cap-like cover projecting radially from it. In such an embodiment, the cover is lifted off directly from the piston rod and therefore in a fault-free manner from the outflow orifice, and can also deploy the impact bag mechanically to some extent in parallel with the quantity of compressed gas flowing out as a result of the actuation of the piston rod and serve as a kind of guide blade for the escaping compressed gas which can thereby be deflected in a controlled manner and enter the impact bag in a diffuser-like way.

The cover of the present invention can be equipped with an edge which extends parallel to the axis of the piston rod and which is held sealingly in the manner of a piston in a cylindrical recess of the valve block, as long as the piston rod is in the first end position. This embodiment allows a compact and stable closed configuration of the entire protective device which, in the non-actuated state, is protected against external influences, especially against possible soiling. The outflow orifices of the cover can be provided solely in its edge so that the desired deflection of the escaping quantity of compressed gas is achieved and the undesirable onrush of the central region of the impact bag in the direction of the person to be protected is prevented. These outflow orifices can also be configured as slits which extend from the free end of the edge towards the closed cover part and which have a circular rounding on their closed side.

As a result, the effect of a throttling of the quantity of compressed gas flowing out in the first few milliseconds can be further assisted, because the quantity of compressed gas cannot yet escape through the full cross-section of the outflow slits. To achieve as uniform a distribution as possible of the escaping compressed gas from these outflow slits, a perforated plate having a central recess for the piston rod can be fastened to the free continuous face of the edge.

The length of the edge measured parallel to the piston rod, can be so configured that it corresponds to the displacement travel of the piston rod out of the first end position into the second. With the piston rod extended, the cover with its edge has also come out of the guide completely, so that, in addition to the outflow slits, an annular region can also be provided for the outflowing compressed gas, if this is necessary.

An especially advantageous embodiment is provided if there are in the valve block two diametrically opposed wall parts with extensions which are aligned with one another and the free end faces of which are at a distance from one another somewhat greater than the diameter of the piston rod. It thus becomes possible to provide the maximum possible lever arm for the pivoting of the wall pieces without the space requirement becoming too great.

A sleeve-shaped pressure vessel, closed off by the wall of the valve block, can be connected respectively adjacent to each wall part in accordance with another advantageous feature of the present invention. This then results altogether in an elongate, approximately cylindrical vessel which has centrally, in its middle, the outlet orifice with the diffuser cover attached to the piston rod. Such embodiments are especially suitable for actuating the impact bag for the front passenger because, on account of its dimensions, it can even be accommodated unproblematically in the dashboard above the glove compartment generally to be arranged there.

The valve block can, however, also be surrounded by a tire-shaped pressure vessel which is arranged concentrically relative to the valve block and which is closed on its open inside by a cylindrical wall of the valve block according to another embodiment of the present invention. This affords a compact design but one which, in view of its dimensions, is more suitable for accommodation in the middle part of the steering wheel, i.e. for use as an impact bag for the driver.

In the above embodiments, at least the pressure vessels attached to the valve block can consist of a thin-walled material which is reinforced externally by a composite fiber winding enveloping the pressure vessels. The valve block itself can be produced from a forged hollow section with a greater wall thickness than the material of the pressure vessels. Aluminum or aluminum alloys in particular have proved especially advantageous for this, because the total weight of the protective device can thereby be kept low. This valve block can accommodate not only the outflow orifices but also other functional elements. It can be welded in a gas-tight manner to the pressure-vessel parts.

Both the filling orifice closable in a pressure-tight and gas-tight manner and a safety valve can be provided in the solid valve block. The pressure vessel or pressure vessels can be assigned a pressure sensor, for the continuous detection of the pressure prevailing in the pressure vessels which sensor is mounted either on the wall of the pressure vessels or directly on a wall of the valve block.

BRIEF DESCRIPTION OF THE DRAWINGS

These and other features, objects, and advantages of the present invention will become more apparent from the following detailed description of currently preferred embodiments when taken in conjunction with the accompanying drawings wherein.

DETAILED DESCRIPTION OF THE DRAWINGS

Figure 1:
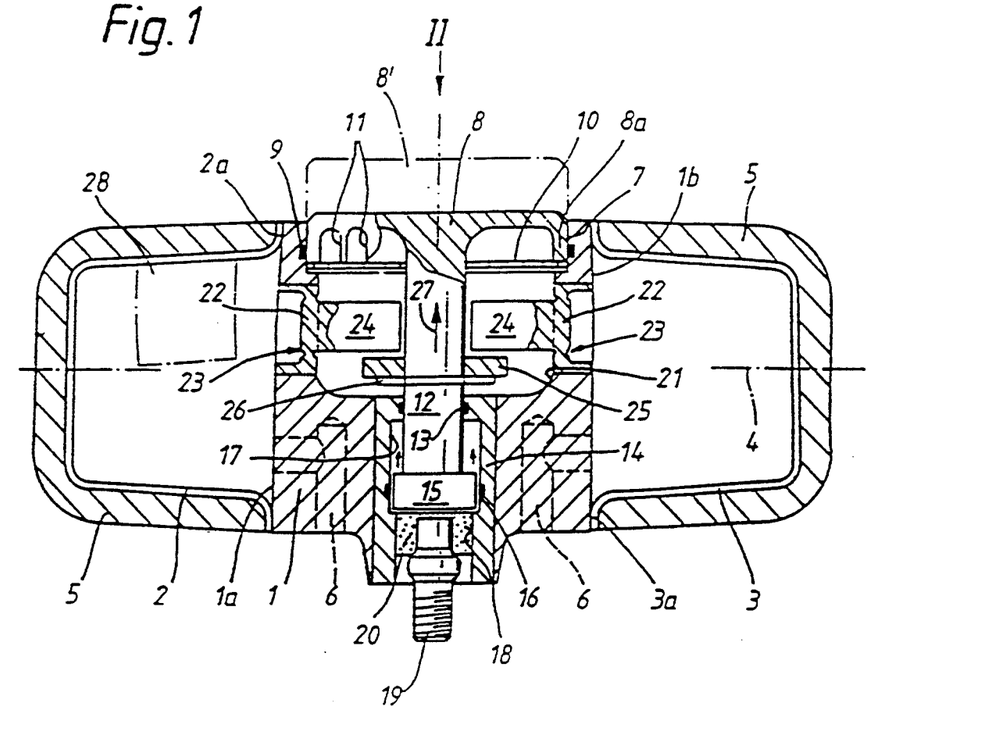
FIG. 1 shows a longitudinal cross-sectional view through a protective device according to one embodiment of the present invention configured as an essentially cylindrical unit, the length of which is greater than the diameter and which is equipped with a deflecting cover for the outflowing gases.
Figure 2:
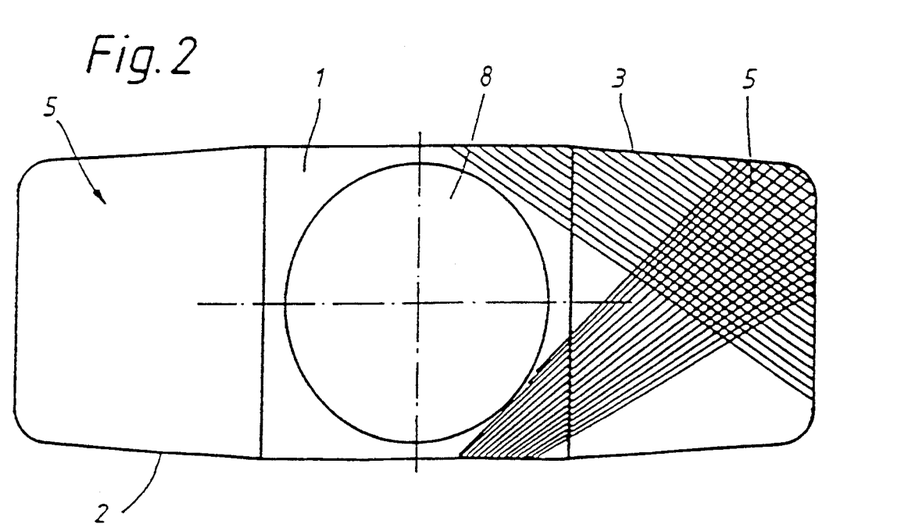
FIG. 2 is a plan view of the protective device of FIG. 1, as seen in the direction of the arrow II.

In FIGS. 1 and 2, are two sleeve-shaped pressure vessels 2 and 3 arranged on both sides of a central valve block 1 and each consist of an aluminum or aluminum-alloy sheet. The vessels 2, 3 have a respective fastening flange 2a and 3a on their open side and by way of this flange are welded sealingly to an associated respective wall 1a and 1b of the valve block 1. The pressure vessels 2, 3 consist of sleeves which are configured rotationally symmetrical relative to a longitudinal mid-axis 4. The valve block 1 adjoins these pressure vessels 2, 3 with its circular walls 1a and 1b which have essentially the same diameter as the flanges 2a and 3a. At least the two pressure vessels 2, 3 are equipped on their outer circumference with a fiber reinforcement such as a composite fiber winding 5 which, as seen in FIG. 2, can, if required, also extend at least partially into the region of the valve block 1. It is also sufficient, however, to equip only the outer faces of the two pressure vessels 2 or 3 with a composite fiber winding giving the intrinsically thin-walled and therefore light pressure vessels 2, 3 sufficient strength for receiving a compressed gas which, after the completion of the pressure-vessel unit, is introduced into the pressure vessels 2, 3 via a respective filling valve 6 arranged in the valve block 1. The filling valves 6 are thereafter welded in a pressure-tight and gas-tight manner such that the pressure of the gaseous medium in the pressure vessels 2, 3, which pressure can be on the order of 500 bars, can be maintained even over a relatively long period of time, especially for the entire lifetime of the protective device subsequently installed in a motor vehicle.

The valve block 1 consists of a forged aluminum or aluminum-alloy hollow section with a greater wall thickness than the wall thickness of the pressure vessels and possesses on one side an extension with a cylindrical recess 7, in which is received a cover 8 equipped with a continuous edge 8a which sits with its cylindrical circumference in the recess 7 and which is held in a sealed-off manner in this recess 7 by an O-ring 9. A perforated sheet-metal disc 10 is fastened to the lower free end face of the edge 8a. Slit-like outlet orifices 11 are formed in the continuous edge 8a from the free end face and are rounded on their closed side to thus acquire an arched shape. These slit-like outlet orifices 11 are distributed uniformly over the entire circumference of the edge 8a.

In the embodiment illustrated in FIGS. 1 and 2, the cover 8 is made in one piece with a piston rod 12 which, sealed off via an O-ring 13, projects from the upper end of a cylinder 14 closed on itself. In the region extending within the tripping cylinder 14, the piston rod 12 has a widened portion to form a piston 15 which, likewise sealed off by an O-ring 16, can be guided in a first tripping cylinder region 17 within the cylinder 14.

A further cylindrical space 18 of a diameter somewhat smaller than that of the tripping cylinder space 17 is located underneath the piston 15. This cylindrical space 18 is closed off downwards by an igniter 19 which projects into the space 18. Moreover, the cylindrical space 18 is filled with a pyrotechnic material 20 which, in the event of ignition, leads to a violent or rapid increase in volume.

Located in the region between the cove 8 and cylinder 14 after the recess 7 is a likewise essentially cylindrical recess 21 which is closed off at the wall parts 1a, 1b of the valve block 1 by pressure-vessel wall pieces 22, each having the form of circular plates delimited relative to the adjacent wall parts by a continuous predetermined breaking point 23. Bolt-like extension pieces 24 project from the plate-shaped wall pieces 22 into the space 21 and terminate with their respective free end faces spaced at a distance from the piston rod 12. The piston rod 12 is itself equipped with a collar in the form of a driving disc 25 which can be held in position in a known way by a retaining ring 26. The edge 8a of the cover 8 has a length measured parallel to the piston rod 12 so as to correspond to the displacement travel of the piston rod out of its first end position into its second end position.

FIGS. 1 and 2 do not show an impact bag inflated by the escaping compressed gas when the device of FIGS. 1 and 2 is actuated. However, this impact bag follows the recess 7 in a way known per se, and in the initial state, in the folded-together form, it rests sealingly with an inlet orifice on the outer edge of the recess 7. The entire protective device, including the impact bag, is then mounted on the dashboard of the vehicle, for example above the glove compartment and in front of the front passenger, by conventional fastening arms.

If a vehicle deceleration greater than a predetermined amount occurs, for example as a result of an accident, the igniter 19 is tripped. The pyrotechnic material located in the cylindrical space 18 is ignited, expands violently and presses the piston 15, together with the piston rod 12, upwards in the direction of the arrow 27. The piston rod 12 is therefore displaced axially out of the first end position shown in FIG. 1 into a second end position in which the piston 15 butts against the upper end of the cylindrical space 17. The cover 8 connected firmly to the piston rod 12 then assumes the position 8' shown in phantom lines.

Before this second end position of the piston rod 12 is reached, however, the driving disc 25 butts against the two bolt-like extensions 24 and pivots these anti-clockwise or clockwise in the direction of the recess 7 under the force of the expanding pyrotechnic material 20. In response to the engagement of the driving disc 25 on the bolts 24 acting as a lever arm, the predetermined breaking point 23 on the circumference of the plate-like wall parts 22 breaks open, to be precise first in the upper and lower regions of the wall pieces 22 arranged parallel to the direction of displacement 27. As a result, on the wall pieces 22 sickle-like breaking points are obtained which are located diametrically opposite one another in parallel with the direction of movement 27 and which, during the progressive displacement of the piston rod 12, increase in size, before they merge into one another and the wall pieces 22 are broken out completely. Until this occurs, the wall pieces 22 are pivoted in a flap-like manner in the region of the predetermined breaking point about the remaining connecting pieces arranged perpendicularly to the direction of displacement 27. This causes a controlled escape of the gas contained under high pressure in the two vessels 2, 3.

In the event of the ignition of the pyrotechnic material 20, therefore, the gas does not flow violently out and into the folded impact bag, which could lead to disadvantages in the unfolding and behavior of the impact bag. On the contrary, the compressed gas initially flows out throttled in a relatively small quantity and then in a quantity of increasing size. Since, simultaneously with this outflow operation, the cover 8 also moves out of its initial position into the end position 8', the slit-like orifices 11 also move only gradually beyond the upper edge of the recess 7 and likewise only gradually open the full outflow orifice. The arcuate configuration of the slit-like orifices 11 thus has an advantageous effect. At the same time, the configuration must be such that at least part of the rounded end of the slitlike orifices 11 has come out beyond the upper edge of the recess 7 when the pivoting operation and the breaking-open of the predetermined breaking points 23 of the wall pieces 22 commence.

At the same time, the cover 8 acts, on one hand as a deflecting device for the escaping compressed gas and ensures that the inflowing gas is guided into the regions which are provided for a proper rapid inflation of the impact bag. The cover 8 itself, however, initiates the unfolding of the impact bag, in that it lifts off the middle region of the impact bag mechanically from the upper edge of the recess 7. It has been shown that, with such a protective device, the desired, exact, but rapid inflation of the impact bag can be achieved. The perforated diaphragm 10 on the underside of the cover 8 contributes to a uniform distribution of the escaping compressed gas.

Finally, it can also be seen from FIG. 1 that the pressure vessel 2 accommodates a pressure sensor 28 which provides information on the pressure prevailing in the interior of the pressure vessel over the entire lifetime of the protective device.

Figure 3:
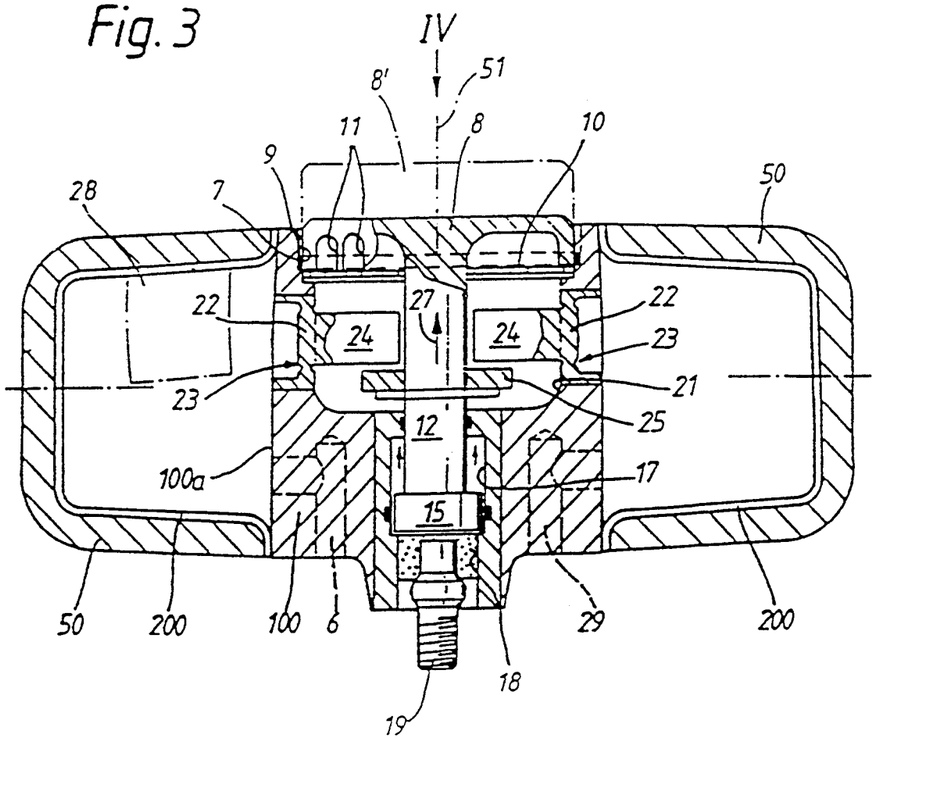
FIG. 3 is a view similar to FIG. 1 but of embodiment of the protective device according to the present invention which, although likewise being configured essentially in the form of a cylinder, has a cylinder diameter substantially greater than its longitudinal extent.
Figure 4:
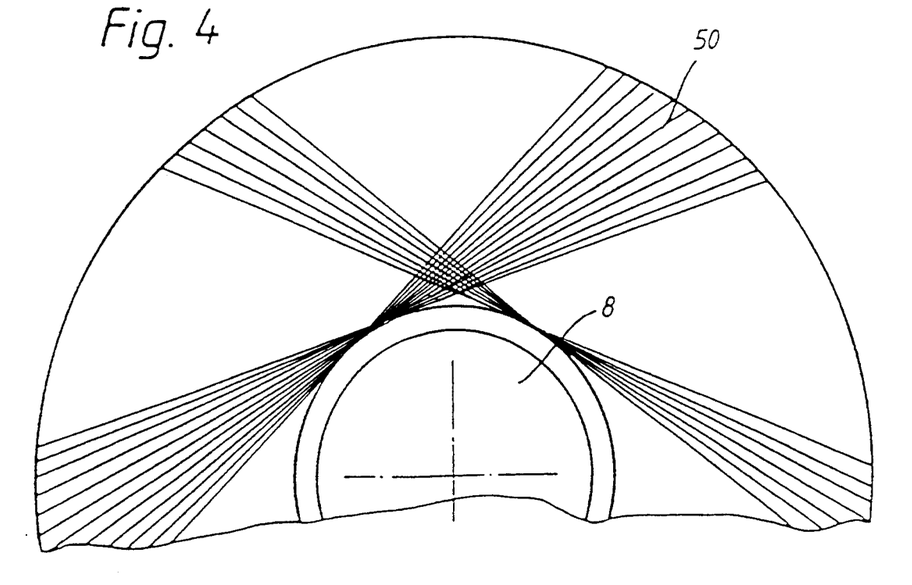
FIG. 4 is a plan view of the protective device of FIG. 3, as seen in the direction of the arrow IV.

FIGS. 3 and 4 show a protective device, with a valve block 100 constructed identically, in terms of its functional parts, to the valve block 1 of FIGS. 1 and 2. The differences are that the outer wall 100a forms a cylindrically continuous wall, while the top side and underside are flat. The pressure vessel 200 consists of a single continuous tire-shaped ring which is entirely enveloped by a composite fiber winding 50.

The internal functional parts of the valve block 100, which have already been described with reference to FIG. 1 are also given the same reference symbols because they are made identically to those parts of the embodiment of FIGS. 1 and 2. The main difference in the general construction from the embodiment of FIGS. 1 and 2 is that, in the embodiment of FIGS. 3 and 4, the axis 51 of the piston rod 12 is also the mid-axis of the entire device and consequently also the mid-axis of the tire-shaped pressure vessel 200 with the composite fiber winding 50. A device, such as is shown in FIGS. 3 and 4, is especially suitable for the installation of an airbag system in the hub of the motor vehicle steering wheel. The functioning of the valve block 100 is the same as that of the valve block 1 and thus is not again described.

In the embodiment of FIGS. 3 and 4, instead of the filling valve provided for the second pressure vessel 3 of FIG. 1, there can be a safety leakage valve 29 in the valve block 100 which ensures a controlled bleeding of the compressed gas, e.g. when the pressure in the pressure vessel 22 becomes too high as a result of a temperature effect, such as in the event of a vehicle fire. Of course, such a safety leakage valve, for example a fusible valve, can also be provided in the valve block 1 of the embodiment of FIGS. 1 and 2 in addition to the two filling valves 6 provided there.

Figure 5:
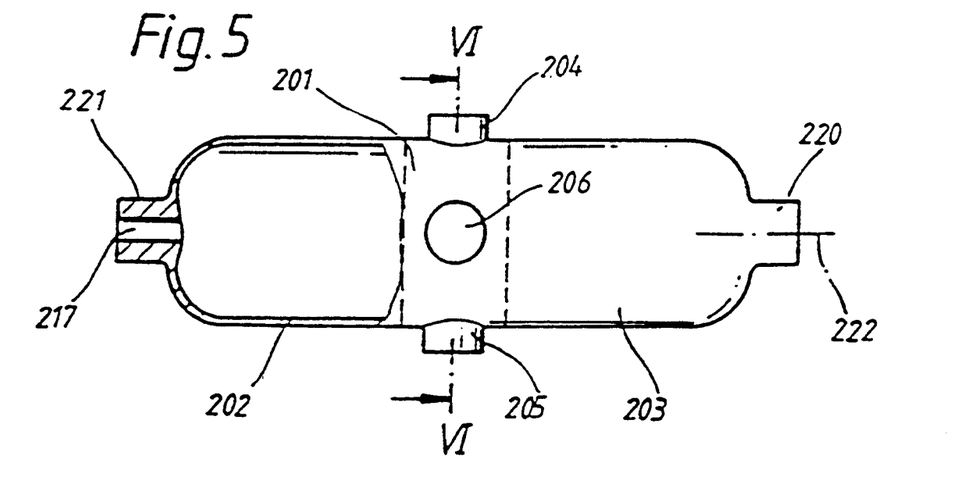
FIG. 5 is a partial cross-sectional view of a pressure vessel of a protective device which, similar to the embodiment of FIG. 1, is suitable for arrangement in the region of the dashboard above a glove compartment in front of a front passenger seat of a passenger car, but without a deflecting cover for the outflowing gas.

The pressure vessel 201, 202, 203 illustrated in FIG. 5 is part of a protective device for occupants of a passenger car arranged in front of the front passenger seat of the vehicle interior in the region of a dashboard mounted underneath the windscreen. The protective device is located, for example, in a dashboard space designed specially for this above the glove compartment so that the functioning of the glove compartment is not impaired. The pressure vessel 201, 202, 203 forms a hollow-cylindrical constructional part which is essentially rotationally symmetrical about its longitudinal mid-axis 222 closed on its end faces located opposite one another and on each end equipped with a connection piece 220, 221. The dimensions of the pressure vessel 201, 202, 203 are determined such that it can be fitted into the dashboard space provided transversely relative to the direction of travel of the passenger car. The two connection pieces 220, 221 serve for fastening pressure vessel 201, 202, 203. To this end, there are, for example, on a corresponding body frame part in the region above the glove compartment, two bearing flanges which engage round the two connection pieces 220, 221 and which thus fix the pressure vessel 201, 202, 203. The pressure vessel 201, 202, 203 is surrounded by an inflatable drum-like bag fixed to the pressure vessel in the region of the two connection pieces 220, 221 and which is supported at the rear against a support plate. This bag, in its rest position, is folded together in front of the pressure vessel 201, 202, 203, and, in the event of an accident, inflates within a few milliseconds in the direction of the front passenger and largely protects the latter from injury. For achieving this end, in the dashboard cover covering the space for the protective device there is a predetermined breaking point, by way of which the cover swings upwards towards the windscreen and thus allows the expansion of the bag. The filling volume of the bag amounts to approximately 140-170 liters.

Provided in the middle of the pressure vessel 201, 202, 203 concentrically to the longitudinal mid-axis 222 is a central valve block 201 which forms an annular hollow-section part and two adjoining mutually opposed vessel parts 202, 203 resembling half shells, for example bell-shaped. The valve block 201 is forged from aluminum. The vessel parts 202, 203 are thin-walled and likewise produced from aluminum material. They are rotationally symmetrical and are equipped on their free end faces with the connection pieces 220 and 221. The respectively opposite open end face of the vessel part 202, 203 makes a butt joint with the respective end face of the valve block 201 and is welded thereto in a gas-tight manner. The gas-tight welding is carried out, for example, by electron-beam or laser-beam welding.

Figure 6:
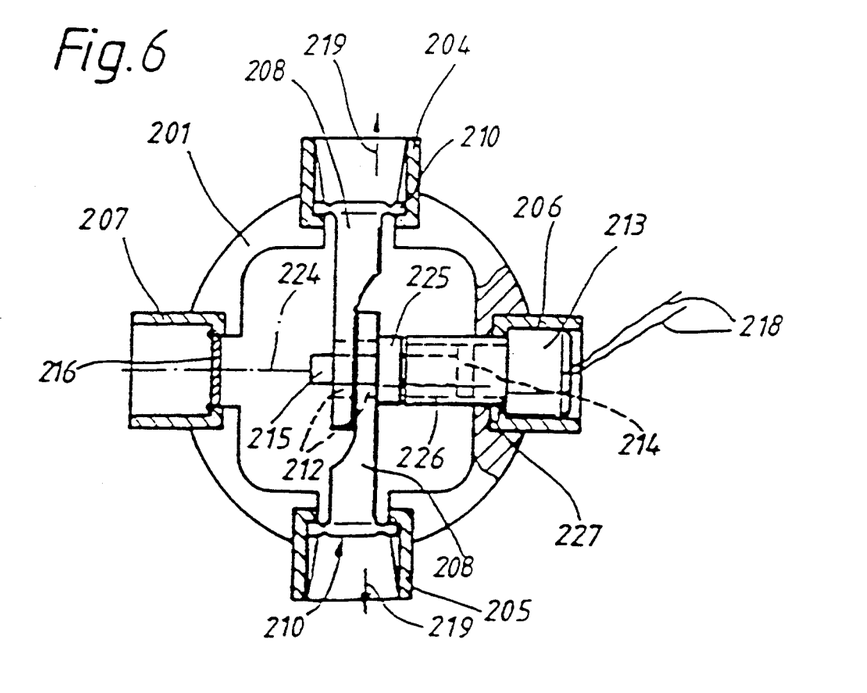
FIG. 6 is a cross-sectional view through the valve block of the pressure vessel along line VI-VI of FIG. 5, with four connections for functional elements being arranged distributed over the circumference of the valve block.

As a result of this connection, the vessel parts 202, 203 and the valve block 201 provide a common pressure vessel. The forged valve block 201 has different wall thicknesses which are obtained as a result of an essentially square inner cross-section or by an essentially cylindrical outer contour as seen in FIGS. 5 and 6. In the region of the four sides of the square inner cross-section, four tubular connections 204, 205, 206, 207 are arranged distributed symmetrically over the circumference of the valve block 201 and each connection projects radially outwards. The connections 204, 205, 206, 207 are thus arranged in the region of increased wall thickness and therefore increased stability of the valve block 201. To increase its strength, the pressure vessel 201, 202, 203 is wound around with high-strength aramid or carbon fibers which are fixed in position on the pressure vessel by epoxy resin. As a result of this fiber winding, the pressure vessel 201, 202, 203 acquires a high strength, while at the same time having a low weight. The pressure vessel serves for the storage of a gas, for example nitrogen, which is stored in the pressure vessel 201, 202, 203 under a pressure of approximately 400 to 500 bar.

Figure 8:
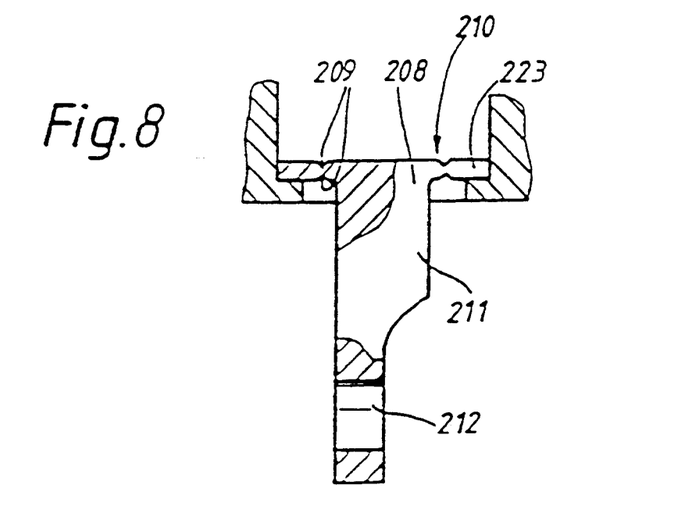
FIG. 8 is an enlarged cross-sectional view of a fragmentary portion of the valve block of FIG. 6, showing an outflow valve welded into a outlet orifice and being equipped with a valve stem projecting into the pressure vessel.

The two connections 204, 205 of the valve block 201 are arranged opposite one another and are each provided with an outflow orifice leading into the interior of the pressure vessel. As can be seen especially in FIG. 6 and, in particular, FIG. 8, these outflow orifices are sealed off by two valve discs 210 welded into the respective outflow orifices. The valve discs 210 rest on an annular shoulder of the connection 204, 205 and are welded thereto in a gas-tight manner. They each have a valve stem 208 projecting into the vessel interior as described more fully below. Each valve disc 210 is equipped on its top side and/or its underside with two mutually opposed annular grooves 209 forming an annular predetermined breaking line corresponding to the diameter of the outflow orifice.

As is apparent from FIG. 6, the two valve stems 208 form finger-like extensions each projecting beyond the mid-plane of the pressure vessel in the direction of the opposite valve disc 210 and thus overlapping in their end region. To allow this overlap, the valve stems 208 taper to half their width from approximately one third of their length projecting into the vessel interior. The taper occurs asymmetrically such that, as shown in FIG. 6, one valve stem 208 projects on the left of the longitudinal mid-plane and the valve stem 208 on an opposed connection correspondingly in the same sense on the right of the longitudinal mid-plane past the adjacent valve stem 208. The two valve stems 208 therefore bear against one another in the middle region of the vessel interior. In an end region overlapped by the other valve stem 208, each valve stem is provided with a long hole 212 such that the long holes are in alignment with one another in the direction of the mid-axis 224.

A piston rod 215 of a stepped piston 214, 215, 225 projects through the long holes 212. Arranged coaxially to the mid-axis 224 on the side of the valve block 201 on the right in FIG. 6 is a hollow-cylindrical connection 206 in which a pyrotechnic system containing a lifting element 213 is fastened. This lifting element 213 contains an electrical igniter, whose electrical leads 218 are shown diagrammatically. In the lifting element 213 there is a small quantity of propellent-charge powder which burns upon ignition and which generates a propellent gas. The pyrotechnic system serves for driving the stepped piston 214, 215, 225 in the direction of the valve stems 208 described below. The pyrotechnic system is sealed off hermetically in itself so that, even during ignition, no propellent gas can pass outwardly into the environment or int the vessel interior.

The bottom of the hollow-cylindrical connection 206 is equipped with an annular stop shoulder 227, against which the lifting element 213 bears. The lifting element 213 seals the connection 206 off from the outside in a gas-tight manner. A cylinder-like guide 226 projecting into the vessel interior concentrically relative to the mid-axis 224 adjoins the stop shoulder 227 and sliding accommodates the stepped piston 214, 215, 225 for guided sliding. The stepped piston 214, 215, 225 has two cylindrical piston parts 214 and 225 spaced from and connected to one another and a piston rod 215. The piston part 225 is located approximately in the middle of the stepped piston 214, 215, 225, so that the piston rod 215 projects from the piston part 214 beyond the piston part 225. The diameter of the piston part 214 corresponds to the inside diameter of the cylindrical guide 226 which that the piston part 214 is slidable in the cylindrical guide 226. The diameter of the piston part 25 corresponds to the outside diameter of the cylinder-like guide 226. With the piston part 214 located within the guide 226, in the position shown in FIG. 6 the piston part 225 directly adjoins the end face of the tubular guide 226 and, on its opposite side, bears against the valve stem 208 of the valve disc 210 fastened in the connection 205. The piston rod 215 of the stepped piston 214, 215, 225 projects through the two long-hole orifices 212 of the two valve stems 208.

Figure 7:
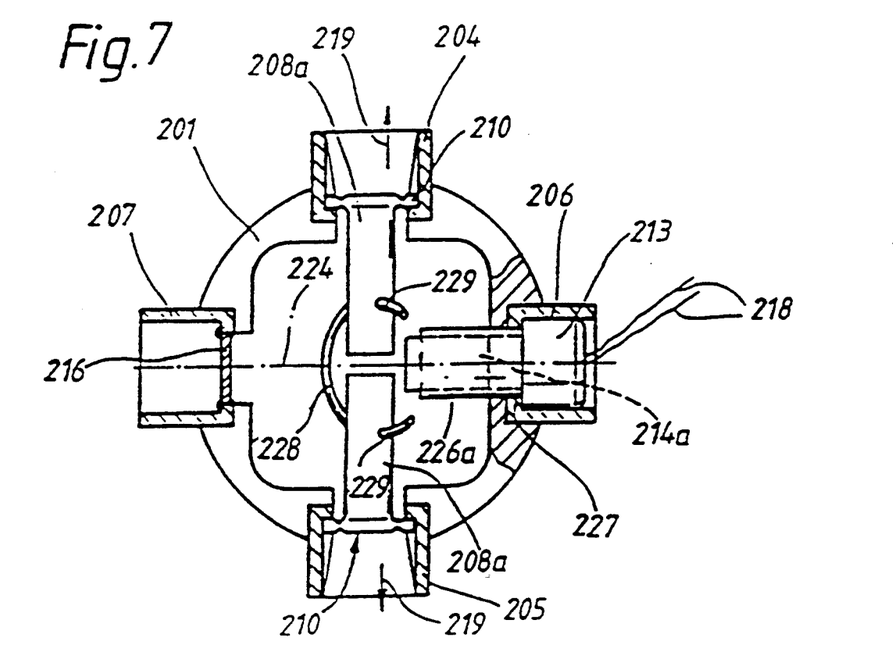
FIG. 7 is a cross-sectional view similar to FIG. 6 but through another embodiment of a valve block.

In the embodiment according to FIG. 7, the valve discs 210 in the mutually opposed connections 204, 205 are equipped with bolt-like valve stems 208a projecting into the vessel interior. The valve stems 208a are arranged coaxially relative to one another and at their end faces adjoin one another at a short mutual distance symmetrically in relation to the longitudinal mid-plane defined by the axis 224. In contrast to the embodiment according to FIG. 6, therefore, the free end faces of the valve stems 208a are flush in the sense of being opposite one another. In a similar way to FIG. 6, however, the pyrotechnic system containing the lifting element 213 also has a bolt-like piston 214a which is directed towards the ends of the valve stems 208a perpendicularly thereto and guided in a corresponding guide 226a. Each valve stem 208a has a bore 229, through which a steel retaining ring 228 projects. For the sake of clarity in FIG. 7, the retaining ring 228 is shown broken open. In order to hold the outflow valves 210, 208a with sufficient safety in the vessel interior, however, the retaining ring 228 in practice is fastened, for example rigidly, in the bores 229 or its two ends are connected to one another by welding or soldering. The functioning of this arrangement essentially corresponds to the functioning described in detail below with reference to the embodiment of FIG. 6 except that the piston 214a strikes flush against the ends of The valve stems 208a.

A connection 207 is provided on the opposite side of the connection 206 concentrically relative to the mid-axis 224 in which a pressure indicator device for indicating the vessel pressure is fastened. The pressure indicator device has, for example, an electronic measuring system (not shown), to which a control unit is connected to allow a signal evaluation of the pressure signals supplied by the pressure indicator device and consequently a check of the particular prevailing vessel pressure. The connection 207 is sealed off relative to the vessel interior by a diaphragm 216 welded into the connection 207 in a gas-tight manner and the deformation of which serves for the electronic measuring system as a measure of the internal pressure of the vessel.

The connection piece 221 of the vessel part 202 is provided, as shown in FIG. 5, with a threaded bore 217 projecting into the vessel interior and into which a fusible valve can be screwed. This fusible valve of a known type serves to allow the vessel content under high pressure, for example inert gas or also nitrogen, to flow off into the environment slowly and in a controlled manner in the event of vehicle fires. This threaded bore 217 can, for example, be used at the same time as a filling orifice.

In another embodiment, the filling orifice is situated on the opposite connection piece 220 of the pressure vessel 201, 202, 203 and is closed off after the filling operation in a pressure-tight and gas-tight manner by a stopper.

After the electric ignition of the propellant charge of the lifting element 213 in the pyrotechnic system, the stepped piston 214, 215, 225 is driven coaxially with respect to the mid-axis 224 into the interior of the vessel. As a result of this load, the two valve stems 208 of the valve disks 210 (on the left in FIG. 6) are bent thereby causing the valve disks 210 to break along their desired breaking points 209 and to detach from their edge 223 which is fixed by soldering. The bending-out of the valve stems 208a takes place in the same but more stable manner than the valve stems 208 according to FIG. 6, thus ensuring a more precise breaking of the valve disks 210 along their desired breaking points 209. When the valve disks 210 break open, they rotate about an imaginary mid-axis which is perpendicular to the plane of the drawing so that, shortly after the breaking-open of the desired breaking lines 209, crescent-shaped openings appear on two opposite sides of each valve disk 210 through which the highly pressurized gas at first flows out relatively slowly for a short period of time. The characteristic outflow line is therefore flat at first. The desired breaking lines 209 are configured such that the valve disks, when they are broken open, have an outflow characteristic forming a lefthand-twist characteristic line. After the valve discs 210 have been bent off completely about the imaginary mid-axis, the characteristic line of the outflow characteristic consequently rises steeply until, as a result of the almost concluded outflow operation and the pressure equalization associated therewith, it becomes flatter and approximates a horizontal line. The characteristic line described here can be represented in a conventional pressure/time diagram. Thus, the pressure is plotted on the ordinate of such a diagram, and the time during the outflow operation is plotted on the abscissa. As a result of the smooth onset of this characteristic line, an overloading of the bag to be inflated is prevented at the start of the outflow operation.

The bag thus inflates solely as a result of the expansion of the gas which is under high pressure in the pressure vessel 201, 202, 203. The pyrotechnic system itself serves merely for moving the piston 214a or 214, 215, 224 and is closed off in itself so that no propellent gas can flow off into the bag or into the environment. The mutually opposed arrangement of two outflow valves which are simultaneously bent and opened results in a repulsion-free outflow of the gas into the bag. As a result, no excessive loads on the pressure vessel 201, 202, 203 occur during the outflow operation. This is necessary especially because the gas in the vessel interior is under a very high pressure.

The protective device described can be employed not only for use in passenger cars, but also in other vehicles for passenger transport, such as omnibuses and railway carriages.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A protective device for occupants of a motor vehicle usable with a gas inflatable bag, comprising a pressure vessel for storage of a pressurized gas with an outflow orifice provided in a wall of the pressure-vessel, a closed tripping cylinder filled with a pyrotechnic medium, at least one valve having a pressure-vessel wall piece surrounded by a predetermined breaking point and a piston rod associated operatively with the wall piece and projecting on one side thereof from the closed tripping cylinder for closing the outflow orifice, the piston rod being axially displaceable out of a first end position into a second end position by a piston arranged in the tripping cylinder when the pyrotechnic medium is ignited, wherein the wall piece comprises a wall of a hollow valve block provided with the outflow orifice and an extension projecting into the interior of the valve block, the piston rod having means for impacting the extension and being displaceable in the valve block transversely relative to the extension, and the extension is located in the path of movement of the means for impacting, whereby when the piston is displaced from said first end position to said second end position, said means for impacting impacts said extension, causing said predetermined breaking point to be exceeded.

2. The protective device according to claim 1, wherein the outflow orifice is covered by a cap-like cover provided with outlet orifices, and the piston rod has, at its end facing away from the piston, the cap-like cover projecting radially therefrom.

3. The protective device according to claim 1, wherein the piston is connected to the piston rod and, in the second end position of the piston rod, bears against an end face of a cylindrical space of the tripping cylinder.

4. The protective device according to claim 3, wherein the outflow orifice is covered by a cap-like cover provided with outlet orifices, and the piston rod has, at its end facing away from the piston, the cap-like cover projecting radially therefrom.

5. The protective device according to claim 2, wherein the cover has an edge extending parallel to the axis of the piston rod and is held sealingly in a piston-like manner in a cylindrical recess of the valve block at the first end position of the piston rod.

6. The protective device according to claim 5, wherein the piston is connected to the piston rod and, in the second end position of the piston rod, bears against an end face of a cylindrical space of the tripping cylinder.

7. The protective device according to claim 5, wherein the outlet orifices of the cover are provided solely in the edge.

8. The protective device according to claim 7, wherein the outlet orifices are configured as slits which extend from a free end of the edge towards the cover.

9. The protective device according to claim 8, wherein the slits have a circular rounding on a closed side thereof.

10. The protective device according to claim 5, wherein a perforated plate having a central recess for the piston rod is operatively associated with a free continuous end face of the edge.

11. The protective device according to claim 5, wherein the edge has a length measured parallel to the piston rod to correspond to the displacement travel of the piston rod out of the first end position into the second end position.

12. The protective device according to claim 1, wherein two diametrically opposed wall pieces with extensions arranged in alignment with one another are provided in the valve block and the free end faces thereof are spaced from one another at a distance somewhat greater than the diameter of the piston rod.

13. The protective device according to claim 12, wherein the pressure vessel is sleeve-shaped and is closed off by the wall of the valve block adjacent to each wall piece.

14. The protective device according to claim 13, wherein the pressure vessel has a cylindrical-like shape and is oriented with a longitudinal mid-axis thereof in alignment with another pressure vessel.

15. The protective device according to claim 12, wherein the valve block is surrounded by a tire-shaped pressure vessel arranged concentrically relative to the valve block and is closed on its open inside by a cylindrical wall of the valve block.

16. The protective device according to claim 13, wherein at least the pressure vessel attached to the valve block comprises a thin-walled material reinforced externally by an enveloping composite fiber winding.

17. The protective device according to claim 15, wherein at least the pressure vessel attached to the valve block comprises a thin-walled material reinforced externally by an enveloping composite fiber winding.

18. The protective device according to claim 13, wherein the valve block is a forged hollow section with a greater wall thickness than the pressure-vessel wall thickness.

19. The protective device according to claim 15, wherein the valve block is a forged hollow section with a greater wall thickness than the pressure-vessel wall thickness.

20. The protective device according to claim 16, wherein the valve block is a forged hollow section with a greater wall thickness than the pressure-vessel wall thickness.

21. The protective device according to claim 18, wherein at least one of a filling orifice closeable in a pressure-tight and gas-tight manner and a safety valve for at least one pressure vessel is provided in the valve block.

22. The protective device according to claim 1, wherein a pressure sensor is assigned to a respective pressure vessel for continuous detection of pressure prevailing in the associated pressure vessel.

23. The protective device according to claim 1, wherein the piston rod includes a collar, and the extension is located in the path of movement of the collar.

24. The protective device according to claim 12, wherein the piston rod includes a collar, and the extensions are located in the path of movement of the collar.

* * * * *